US012683266B2

(12) United States Patent
Sun et al.

(10) Patent No.: US 12,683,266 B2
(45) **Date of Patent: *Jul. 14, 2026**

(54) RADIATOR SHARING ANTENNA AND ELECTRONIC DEVICE

(71) Applicant: Huawei Technologies Co., Ltd., Shenzhen (CN)

(72) Inventors: Qiao Sun, Xi'an (CN); Kun Li, Xi'an (CN); Liang Lu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

This patent is subject to a terminal disclaimer.

(21) Appl. No.: 18/649,166

(22) Filed: Apr. 29, 2024

(65) Prior Publication Data

US 2024/0283137 A1    Aug. 22, 2024

Related U.S. Application Data

(63) Continuation of application No. 17/432,731, filed as application No. PCT/CN2020/074608 on Feb. 10, 2020, now Pat. No. 12,003,017.

(30) Foreign Application Priority Data

Feb. 27, 2019    (CN) .......................... 201910146738.1
Apr. 4, 2019    (CN) .......................... 201910278901.X

(51) Int. Cl.
*H01Q 1/24*        (2006.01)
*H01Q 1/48*        (2006.01)
(Continued)

(52) U.S. Cl.
CPC .............. *H01Q 1/243* (2013.01); *H01Q 1/48* (2013.01); *H01Q 5/35* (2015.01); *H01Q 9/42* (2013.01); *H04M 1/0281* (2013.01)

(58) Field of Classification Search
CPC .......................... H01Q 1/243; H01Q 5/30–40
See application file for complete search history.

(56) References Cited

U.S. PATENT DOCUMENTS 9,905,911 B2    2/2018  Chen et al.
2012/0256800 A1    10/2012  Kuonanoja
(Continued)

FOREIGN PATENT DOCUMENTS

CN        104103888 A    10/2014
CN        104752827 A    7/2015
(Continued)

OTHER PUBLICATIONS

Zhou Qiangqiang, "Common-metal-frame MIMO Antenna for Terminal Device," 2017, with an English Abstract, 78 pages.

*Primary Examiner* — Hasan Islam
(74) *Attorney, Agent, or Firm* — Conley Rose, P.C.

(57)        ABSTRACT

A terminal device includes a radiator sharing antenna. The radiator sharing antenna includes a radiator that is divided into a first sub-radiator and a second sub-radiator through a gap, a first feeding point located on the first sub-radiator, and a second feeding point located on the second sub-radiator. The first feeding point is configured to pass a first radio frequency signal through resonance of the first sub-radiator and through parasitic resonance of the second sub-radiator, and the second feeding point is configured to pass a second radio frequency signal through resonance of the second sub-radiator and through parasitic resonance of the first sub-radiator.

24 Claims, 10 Drawing Sheets

(51) Int. Cl.
  *H01Q 5/35*    (2015.01)
  *H01Q 9/42*    (2006.01)
  *H04M 1/02*    (2006.01)

(56)      References Cited

U.S. PATENT DOCUMENTS

| | | | |
|---|---|---|---|
| 2018/0026339 | A1 | 1/2018 | Chih et al. |
| 2018/0069317 | A1 | 3/2018 | Vazquez et al. |
| 2018/0248264 | A1 | 8/2018 | Chen et al. |
| 2018/0358699 | A1 | 12/2018 | Li et al. |
| 2018/0375193 | A1 | 12/2018 | Zhang et al. |
| 2018/0375971 | A1 | 12/2018 | Sun et al. |
| 2019/0207297 | A1 | 7/2019 | Gu |
| 2020/0058992 | A1 | 2/2020 | Wu et al. |
| 2020/0321988 | A1 | 10/2020 | Kim et al. |
| 2021/0305703 | A1 | 9/2021 | Li |

FOREIGN PATENT DOCUMENTS

| | | | |
|---|---|---|---|
| CN | 104993241 | A | 10/2015 |
| CN | 105514624 | A | 4/2016 |
| CN | 107181045 | A | 9/2017 |
| CN | 107959106 | A | 4/2018 |
| CN | 108232421 | A | 6/2018 |
| CN | 108346863 | A | 7/2018 |
| CN | 108470977 | A | 8/2018 |
| CN | 207732080 | U | 8/2018 |
| CN | 207800915 | U | 8/2018 |
| CN | 108631041 | A | 10/2018 |
| CN | 108832267 | A | 11/2018 |
| CN | 109546311 | A | 3/2019 |
| CN | 108701889 | B | 2/2020 |
| EP | 3086403 | A1 | 10/2016 |
| WO | 2017101068 | A1 | 6/2017 |

RADIATOR SHARING ANTENNA AND ELECTRONIC DEVICE

CROSS-REFERENCE TO RELATED APPLICATIONS

This application is a continuation of U.S. patent application Ser. No. 17/432,731, filed on Aug. 20, 2021, which is a National Stage of International Patent Application No. PCT/CN2020/074608, filed on Feb. 10, 2020, which claims priority to Chinese Patent Application No. 201910278901.X, filed on Apr. 4, 2019 and Chinese Patent Application No. 201910146738.1, filed on Feb. 27, 2019. All of the aforementioned patent applications are hereby incorporated by reference in their entireties.

TECHNICAL FIELD

This application relates to the field of communications technologies, and in particular, to a radiator sharing antenna and an electronic device.

BACKGROUND

With continuous development of communications technologies, more antennas need to be deployed in a mobile terminal such as a mobile phone. In addition, because a development trend of the mobile terminal such as a mobile phone is to have a high screen-to-body ratio and a plurality of cameras, an antenna clearance is greatly reduced and antenna deployment space is further reduced. Therefore, how to deploy more antennas in limited clearance space becomes a difficult problem in antenna design.

SUMMARY

This application provides a radiator sharing antenna and an electronic device, to reduce space occupied by an antenna and deploy more antennas in limited clearance space.

According to a first aspect, this application provides a radiator sharing antenna. The radiator sharing antenna includes a radiator, a first ground point, a second ground point, a first feeding point, a second feeding point, a first filter circuit, and a second filter circuit. Both the first ground point and the second ground point are grounded, and the first ground point and the second ground point are respectively located at two opposite ends of the radiator. A gap is disposed in the radiator and divides the radiator into a first sub-radiator and a second sub-radiator. The first feeding point is located on the first sub-radiator, and the second feeding point is located on the second sub-radiator. One end of the first filter circuit is connected to the first feeding point, and the other end of the first filter circuit is grounded. One end of the second filter circuit is connected to the second feeding point, and the other end of the second filter circuit is grounded. A radio frequency signal transmitted through the first feeding point generates operating bands in a plurality of different antenna modes through resonance of the first sub-radiator and parasitic resonance of the second sub-radiator. A radio frequency signal transmitted through the second feeding point generates operating bands in a plurality of different antenna modes through resonance of the second sub-radiator and parasitic resonance of the first sub-radiator.

In this application, at least two feeding points (including the first feeding point and the second feeding point) are disposed on the radiator between the first ground point and the second ground point. In this way, compared with an antenna structure in which only one feeding point is disposed on a radiator between two adjacent ground points (that is, one feeding point is disposed on each radiator), the two feeding points in this application can be simultaneously configured to perform signal transmission transmit signals. Therefore, a plurality of antenna modes can be simultaneously generated on the radiator, and different antenna modes share the radiator, to reduce a volume occupied by an antenna. In addition, when a same type of antenna mode is included, in this application, feeding points and corresponding radio frequency elements that are used can be reduced by sharing the radiator, thereby further simplifying an antenna structure and reducing a volume occupied by an antenna.

In this application, the gap is disposed to divide the radiator into the first sub-radiator and the second sub-radiator, and the first sub-radiator and the second sub-radiator are separately fed. When the first sub-radiator generates resonance because a signal is fed through the first feeding point, the second sub-radiator generates parasitic resonance under influence of the first sub-radiator. In addition, when the second sub-radiator generates resonance because a signal is fed through the second feeding point, the first sub-radiator generates parasitic resonance under influence of the second sub-radiator. Parasitic resonance is generated on the radiator sharing antenna through mutual influence between the first radiator and the second radiator, to further increase operating bands covered with the antenna, that is, further avoid increasing space occupied by an antenna while a quantity of antenna modes is increased.

Further, in this application, one end of the first filter circuit is connected to the first feeding point, and the other end of the first filter circuit is grounded. One end of the second filter circuit is connected to the second feeding point, and the other end of the second filter circuit is grounded. Therefore, the first filter circuit and the second filter circuit adjust a feeding location of a radio frequency signal. Different antenna modes are generated because of different feeding locations. To be specific, the first filter circuit and the second filter circuit are used, so that more different antenna modes can be obtained for the radiator sharing antenna, to avoid increasing antenna deployment space while a required antenna mode is ensured.

In an embodiment of this application, the first filter circuit is a high-impedance low-pass filter circuit, and the high-impedance low-pass filter circuit is a passband in a GPS band, and is a stopband in a band higher than or equal to 2.4G Wi-Fi. To be specific, the first filter circuit allows a radio frequency signal in the GPS band to pass, and does not allow a radio frequency signal in the band higher than or equal to 2.4G Wi-Fi to pass. The second filter circuit is a high-pass low-impedance filter circuit, and the high-pass low-impedance filter circuit is a stopband in the GPS band, and is a passband in the band higher than or equal to 2.4G Wi-Fi. To be specific, the first filter circuit allows a radio frequency signal in the band higher than or equal to 2.4G Wi-Fi to pass, and does not allow a radio frequency signal in the GPS band to pass. A radio frequency signal of a specific band can be grounded by using the first filter circuit, and a radio frequency signal of a specific band can be grounded by using the second filter circuit. A location of a ground point is changed, so that feeding locations of different radio frequency signals are different, thereby obtaining different antenna modes.

In an embodiment of this application, the first filter circuit and the second filter circuit each include a first capacitor and a first inductor that are disposed in parallel.

In another embodiment of this application, the first filter circuit or the second filter circuit further includes a second inductor, and the second inductor is connected in series to the first capacitor.

In another embodiment of this application, the first filter circuit or the second filter circuit further includes a second capacitor, and the second capacitor is connected in series to the first capacitor and the first inductor that are disposed in parallel.

In some embodiments of this application, the operating bands generated through the resonance of the first sub-radiator and the parasitic resonance of the second sub-radiator cover operating bands of a Wi-Fi antenna and a Sub 6G antenna, that is, the radiator can be used as a radiator of both the Wi-Fi antenna and the Sub 6G antenna, so that the Wi-Fi antenna and the Sub 6G antenna share the radiator. Further, in some embodiments, the operating bands generated through the resonance of the second sub-radiator and the parasitic resonance of the first sub-radiator cover operating bands of a GPS L1 antenna and a GPS L5 antenna, that is, the radiator can be used as a radiator of both the GPS L1 antenna and the GPS L5 antenna, so that the GPS L1 antenna and the GPS L5 antenna share the radiator. It may be understood that, in some embodiments, the operating bands generated through the resonance of the first sub-radiator and the parasitic resonance of the second sub-radiator cover the operating bands of the Wi-Fi antenna and the Sub 6G antenna. In addition, the operating bands generated through the resonance of the second sub-radiator and the parasitic resonance of the first sub-radiator cover the operating bands of the GPS L1 antenna and the GPS L5 antenna. In this way, the Wi-Fi antenna, the Sub 6G antenna, the GPS L1 antenna, and the GPS L5 antenna can share the radiator, so that the radiator sharing antenna occupies relatively small space while covering operating bands in a plurality of different antenna modes. In addition, the radiator sharing antenna can cover a plurality of antenna modes by using the two feeding points (the first feeding point and the second feeding point), and can reduce a quantity of feeding points compared with an antenna in the conventional technology, thereby reducing a quantity of springs or connection cables that connect the feeding points to a radio frequency front end and a quantity of resonance elements for adjusting an antenna mode. This simplifies an antenna structure and further reduces space occupied by the antenna. In some embodiments of this application, operating bands generated through the resonance of the first sub-radiator include a first operating band, a second operating band, and a third operating band, and the operating bands generated through the parasitic resonance of the second sub-radiator include a fourth operating band and a fifth operating band. The first operating band covers an operating band of a 2.4G Wi-Fi antenna, the second operating band and the fourth operating band cover the operating band of the Sub 6G antenna, and the third operating band and the fifth operating band cover an operating band of a 5G Wi-Fi antenna. In these embodiments, the operating bands generated through the resonance of the first sub-radiator and the parasitic resonance generated by the second sub-radiator can cover the operating bands of the Sub 6G antenna, the 2.4G Wi-Fi antenna, and the 5G Wi-Fi antenna, that is, the radiator can simultaneously implement that the Sub 6G antenna and the Wi-Fi antennas share the radiator, to reduce antenna deployment space.

The Sub 6G antenna is an antenna mode whose operating band is lower than 6 GHz. In some embodiments of this application, the Sub 6G band mainly includes 5G bands such as N77, N78, and N79, to meet an existing 5G communication requirement.

Specifically, in some embodiments, the first operating band is an operating band that is in a quarter antenna mode of an IFA and that is generated through the resonance of the first sub-radiator, the second operating band is an operating band that is in a half-wavelength mode of a loop antenna and that is formed from the first feeding point to the first ground point, the third operating band is an operating band that is in a three-quarters antenna mode of the IFA and that is generated through the resonance of the first sub-radiator, the fourth operating band is in a half-wavelength mode of a parasitic loop antenna and is generated through the parasitic resonance of the second sub-radiator, and the fifth operating band is in a three-seconds-wavelength mode of a parasitic loop antenna and is generated through the parasitic resonance of the second sub-radiator.

In some embodiments of this application, the operating bands generated through the resonance of the second sub-radiator include a sixth operating band, the operating bands generated through the parasitic resonance of the first sub-radiator include a seventh operating band, the sixth operating band covers the operating band of the GPS L5 antenna, and the seventh operating band covers the operating band of the GPS L1 antenna. In this way, operating bands generated by the radiator can cover both the operating band of the GPS L5 antenna and the operating band of the GPS L1 antenna, so that the GPS L1 antenna and the GPS L5 antenna share the radiator, to reduce antenna deployment space.

Specifically, in some embodiments, the sixth operating band is an operating band in a composite right/left-handed antenna mode generated through the resonance of the second sub-radiator, and the seventh operating band is an operating band that is in a band antenna mode and that is generated through the parasitic resonance of the first sub-radiator. The sixth operating band is generated in the composite right/left-handed antenna mode. In the composite right/left-handed antenna mode, a length of the radiator is ⅛λ, and the length of the radiator is smaller than that in another antenna mode, thereby further reducing antenna deployment space.

Specifically, in some embodiments, a tuning element is connected between the first feeding point and/or the second feeding point and the radio frequency front end, and the tuning element is configured to adjust a type of each antenna mode of the radiator sharing antenna and to adjust an operating band of the radiator sharing antenna. A type of the tuning element connected between the first feeding point and/or the second feeding point and the radio frequency front end is adjusted according to an actual requirement, so that an antenna mode generated by the radiator sharing antenna can meet an actual usage requirement. In this application, the tuning element may be a capacitor element or an inductor element, and the capacitor element and the inductor element may be connected in parallel or in series between the first feeding point and/or the second feeding point and the radio frequency front end.

In an embodiment of this application, the tuning element includes a capacitor element connected between the second feeding point and the radio frequency front end. The capacitor element is disposed between the second feeding point and the radio frequency front end, so that a composite right/left-handed antenna is formed from the radio frequency front end to the second ground point. A size of the radiator can be reduced as much as possible and antenna deployment space can be reduced while a specific operating band can be obtained.

In this application, a width of the gap is greater than one-thirty-second of a wavelength of a highest resonance frequency and is less than one-sixteenth of the wavelength of the highest resonance frequency, and the highest resonance frequency is a highest operating frequency of operating frequencies in the plurality of different antenna modes of the radiator sharing antenna.

In this application, a width of the gap needs to be controlled to be within a specific range to avoid that the width of the gap is excessively large or small, to ensure that the first radiator and the second radiator can influence each other to generate parasitic resonance in a specific operating band.

In some embodiments of this application, a distance from the first feeding point to the gap is one-sixteenth of a wavelength of an operating frequency in an antenna mode formed between the first feeding point and the gap, a distance from the second feeding point to the gap is one-eighth of a wavelength of an operating frequency in an antenna mode formed between the second feeding point and the gap, a distance from the first ground point to the gap is a quarter of a wavelength of an operating frequency in an antenna mode formed between the first ground point and the gap, and a distance from the second ground point to the gap is a quarter of a wavelength of an operating frequency in an antenna mode formed between the second ground point and the gap. In this application, the distance from the first feeding point to the gap, the distance from the second feeding point to the gap, the distance from the first ground point to the gap, and the distance from the first ground point to the gap are designed to be within a specific range, so that the radiator sharing antenna can generate a required operating band to meet an actual usage requirement.

According to a second aspect, this application further provides an electronic device. The electronic device includes: a middle frame, a mainboard, and the radiator sharing antenna. The middle frame is grounded, and a first ground point and a second ground point of the radiator sharing antenna each are connected to the middle frame, so that the first ground point and the second ground point are grounded. A radio frequency front end of the radiator sharing antenna is disposed on the mainboard, and the mainboard is disposed on the middle frame. Because space occupied by the radiator sharing antenna is relatively small, a required clearance is also relatively small, so that deployment in the electronic device can be more compact.

In some embodiments of this application, the electronic device includes a metal frame disposed around the mainboard and the middle frame, a part of the metal frame is a radiator of the radiator sharing antenna, the part of the metal frame used as the radiator is spaced from the mainboard to form a gap, and the gap is a clearance area of the radiator sharing antenna. The metal frame is used as the radiator of the radiator sharing antenna, so that space occupied by the radiator sharing antenna can be further reduced.

BRIEF DESCRIPTION OF DRAWINGS

To describe structural features and effects of this application more clearly, the following describes the structural features and effects of this application in detail with reference to accompanying drawings and specific embodiments.

DESCRIPTION OF EMBODIMENTS

The following clearly and completely describes the technical solutions in the embodiments of this application with reference to the accompanying drawings in the embodiments of this application.

This application provides a radiator sharing antenna and an electronic device including the radiator sharing antenna. A plurality of different antenna modes can share the radiator of the radiator sharing antenna, so as to reduce space occupied by the antenna. The electronic device includes an electronic device such as a mobile phone, a tablet, and a smartwatch.

Figure 1:
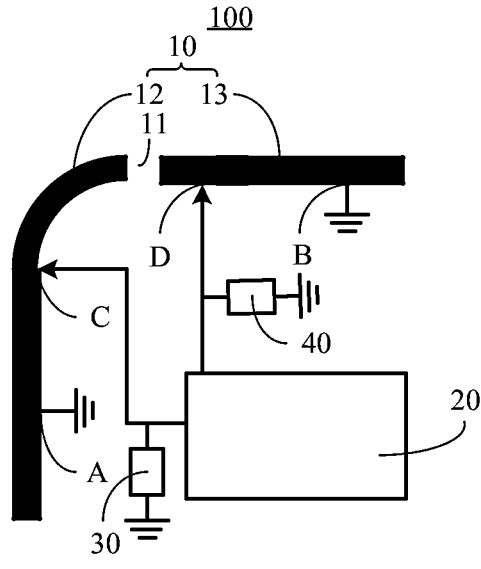
FIG. 1 is a schematic structural diagram of a radiator sharing antenna according to an embodiment of this application.

Referring to FIG. 1, this application provides an antenna 100 sharing a radiator. The antenna 100 sharing a radiator includes a radiator 10, a first ground point A, a second ground point B, a first feeding point C, a second feeding point D, a first filter circuit 30, and a second filter circuit 40. Both the first ground point A and the second ground point B are grounded, and the first ground point A and the second ground point B are respectively located at two opposite ends of the radiator 10. A gap 11 is disposed in the radiator 10 and divides the radiator 10 into a first sub-radiator 12 and a second sub-radiator 13. The first feeding point C is located on the first sub-radiator 12, and the second feeding point D is located on the second sub-radiator 13. The first feeding point C and the second feeding point D each are connected to a radio frequency front end 20. A radio frequency signal generated by the radio frequency front end 20 is transmitted to the radiator 10 by using the first feeding point C and the second feeding point D, or a signal received by the radiator 10 is transmitted to the radio frequency front end 20 by using the first feeding point C and the second feeding point D. Specifically, the first feeding point C and the second feeding point D are connected to the radio frequency front end 20 by using a spring or a connection cable. One end of the first filter circuit 30 is connected in parallel between the first feeding point C and the radio frequency front end 20 and the other end of the first filter circuit 30 is grounded. One end of the second filter circuit 40 is connected in parallel between the second feeding point D and the radio frequency front end 20 and the other end of the second filter circuit 40 is grounded. A radio frequency signal transmitted through the first feeding point C generates operating bands in a plurality of different antenna modes through resonance of the first sub-radiator 12 and parasitic resonance of the second sub-radiator 13. A radio frequency signal transmitted through the second feeding point D generates operating bands in a plurality of different antenna modes through resonance of the second sub-radiator 13 and parasitic resonance of the first sub-radiator 12.

In this application, the radio frequency signal transmitted through the first feeding point C can generate the operating bands in the plurality of different antenna modes through the resonance of the first sub-radiator 12 and the parasitic resonance of the second sub-radiator 13. In addition, the radio frequency signal transmitted through the second feeding point D can generate the operating bands in the plurality of different antenna modes through the resonance of the second sub-radiator 13 and the parasitic resonance of the first sub-radiator 12. Specifically, when the first feeding point C feeds the radio frequency signal into the first sub-radiator 12, the transmitted radio frequency signal causes the first sub-radiator 12 to generate a specific induced electromotive force. Because there is the gap 11 between the first sub-radiator 12 and the second sub-radiator 13 and the gap 11 is equivalent to an equivalent capacitor, the second sub-radiator 13 also generates a specific induced electromotive force through capacitive coupling, that is, the second sub-radiator 13 generates parasitic resonance in a specific band.

In this example, the resonance generated by the first sub-radiator 12 and the second sub-radiator 13 and the parasitic resonance generated through mutual influence between the first sub-radiator 12 and the second sub-radiator 13 increase an operating band covered by the antenna 100 sharing a radiator 10. In addition, quantities of feeding points and radiators do not need to be increased. This can further avoid increasing space occupied by an antenna while increasing a quantity of antenna modes.

Further, in this application, two feeding points (including the first feeding point C and the second feeding point D) are disposed on the radiator 10 between the first ground point A and the second ground point B. In this way, compared with an antenna structure in which only one feeding point is disposed on the radiator 10 between two adjacent ground points (that is, one feeding point is disposed on each radiator 10), in this application, the two feeding points can be simultaneously configured to perform signal transmission. Therefore, a plurality of antenna modes can be simultaneously generated on the radiator 10, and different antenna modes share the radiator 10, to reduce a volume occupied by an antenna. In addition, when a same type of antenna mode is included, a quantity of radiators can be reduced by sharing the radiator 10 in this application, thereby reducing space occupied by the antenna 100 sharing a radiator. In addition, in this application, a plurality of antenna modes can be generated by using the two feeding points (the first feeding point C and the second feeding point D), and a quantity of feeding points can be reduced compared with an antenna in the conventional technology. Therefore, this can reduce a quantity of springs or connecting cables that connect feeding points to the radio frequency front end and a quantity of resonant elements for adjusting an antenna mode, thereby simplifying an antenna structure and further reducing space occupied by the antenna.

Further, in this application, one end of the first filter circuit 30 is connected in parallel between the first feeding point C and the radio frequency front end 20 and the other end of the first filter circuit 30 is grounded, and one end of the second filter circuit 40 is connected in parallel between the second feeding point D and the radio frequency front end 20 and the other end of the second filter circuit 40 is grounded, so that the first filter circuit 30 and the second filter circuit 40 adjust a feeding location of a radio frequency signal. Different antenna modes are generated because of different feeding locations. To be specific, the first filter circuit 30 and the second filter circuit 40 are used, so that more different antenna modes can be obtained for the antenna 100 sharing a radiator, thereby avoiding increasing antenna deployment space while a required antenna mode is ensured.

In this embodiment, the first filter circuit 30 is a high-impedance low-pass filter circuit, and the high-impedance low-pass filter circuit can implement a high-impedance low-pass filtering effect. Specifically, the high-impedance low-pass filtering effect means that the high-impedance low-pass filter circuit is a passband in a GPS band, and is a stopband in a band higher than or equal to 2.4G Wi-Fi. To be specific, the first filter circuit 30 allows a radio frequency signal in the GPS band to pass, and does not allow a radio frequency signal in the band higher than or equal to 2.4G Wi-Fi to pass. The second filter circuit 40 is a high-pass low-impedance filter circuit, and the high-pass low-impedance filter circuit can implement a high-pass low-impedance filtering effect. Specifically, the high-pass low-impedance filtering effect means that the high-pass low-impedance filter circuit is a stopband in the GPS band, and is a passband in the band higher than or equal to 2.4G Wi-Fi. To be specific, the second filter circuit 40 allows a radio frequency signal in the band higher than or equal to 2.4G Wi-Fi to pass, and stops a radio frequency signal in the GPS band from passing. The first filter circuit 30 enables a radio frequency signal in a specific band to be grounded, and the second filter circuit 40 enables a radio frequency signal in a specific band to be grounded, so that feeding locations of different radio frequency signals are different, thereby obtaining different antenna modes.

Figure 2:
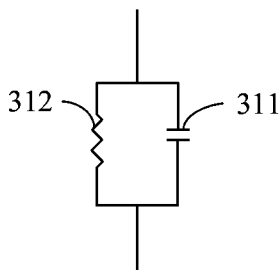
FIG. 2 is a schematic structural diagram of a first embodiment of a filter circuit in a radiator sharing antenna according to an embodiment of this application.
Figure 3:
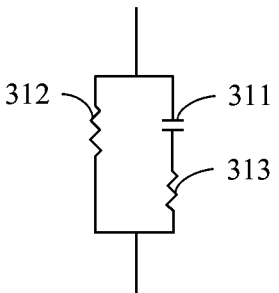
FIG. 3 is a schematic structural diagram of a second embodiment of a filter circuit in a radiator sharing antenna according to an embodiment of this application.
Figure 4:
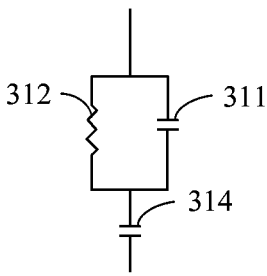
FIG. 4 is a schematic structural diagram of a third embodiment of a filter circuit in a radiator sharing antenna according to an embodiment of this application.
Figure 5:
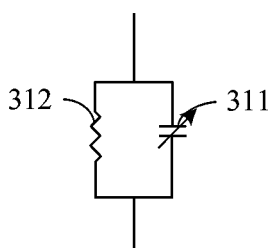
FIG. 5 is a schematic structural diagram of a fourth embodiment of a filter circuit in a radiator sharing antenna according to an embodiment of this application.

In this application, structures of the first filter circuit 31 and the second filter circuit 32 may be in a plurality of different forms. For example, FIG. 2 is a schematic structural diagram of a filter circuit according to an embodiment of this application. The filter circuit includes a circuit of a first capacitor 311 and a first inductor 312 that are disposed in parallel. FIG. 3 is a schematic structural diagram of a filter circuit according to a second embodiment of this application. A difference of a structure of the filter circuit in the embodiment shown in FIG. 3 from the structure of the filter circuit shown in FIG. 2 is as follows: the filter circuit further includes a second inductor 313, and the second inductor 313 is connected in series to the first capacitor 311 and then is connected in series to the first inductor 312. FIG. 4 is a schematic structural diagram of a filter circuit according to a third embodiment of this application. A difference of a structure of the filter circuit in the embodiment shown in FIG. 4 from the structure of the filter circuit shown in FIG. 2 is as follows: the filter circuit further includes a second capacitor 314, and the second capacitor 314 is connected in series to the first capacitor 311 and the first inductor 312 that are disposed in parallel. The first capacitor 311 and the second capacitor 314 may be fixed capacitors or adjustable capacitors, and the first inductor 312 and the second inductor 313 may be fixed inductors or adjustable inductors. For example, FIG. 5 is a schematic structural diagram of a filter circuit according to a fourth embodiment of this application. A difference of a structure of the filter circuit in the embodiment shown in FIG. 5 from the structure of the filter circuit shown in FIG. 2 is as follows: the first capacitor 314 is an adjustable capacitor.

In this application, the first filter circuit 31 and the second filter circuit 32 may be the filter circuit shown in any one of the embodiments in FIG. 2 to FIG. 4, and types of the first filter circuit 31 and the second filter circuit 32 may be the same or different. In this embodiment, the first filter circuit 31 and the second filter circuit 32 each are the filter circuit in the embodiment shown in FIG. 2. A value of any one or several of the first capacitor 311, the second capacitor 314, the first inductor 312, and the second inductor 313 in the filter circuit is adjusted to be different, to implement the high-pass low-impedance effect or the high-impedance low-pass effect of the filter circuit. In this embodiment, the first inductor 312 of the first filter circuit 31 is around 4 nH and the first capacitor 311 of the first filter circuit 31 is around 1 pF, to obtain the high-impedance low-pass filter circuit. The first inductor 312 of the second filter circuit 32 is around 6.8 nH and the first capacitor 311 of the first filter circuit 31 is around 1.5 pF, to obtain the high-pass low-resistance filter circuit.

Figure 6:
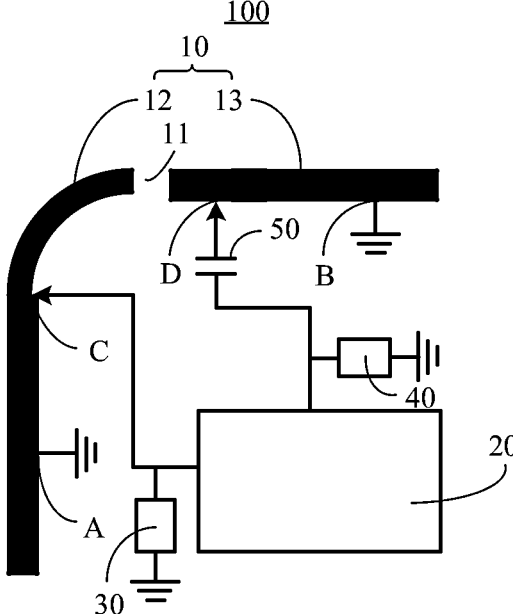
FIG. 6 is a schematic structural diagram of a radiator sharing antenna according to another embodiment of this application.

Further, referring to FIG. 6, in an embodiment of this application, a tuning element 50 is further connected between the first feeding point C and/or the second feeding point D and the radio frequency front end 20. The tuning element 50 is configured to adjust a type of each antenna mode of the antenna 100 sharing a radiator and to adjust an operating band of the antenna mode. A type or a quantity of tuning elements 50 connected between the first feeding point C and/or the second feeding point D and the radio frequency front end 20 is adjusted according to an actual requirement, so that the antenna mode of the antenna 100 sharing a radiator can meet the actual usage requirement. In this application, the tuning element 50 may be a capacitor element or an inductor element, and the capacitor element and the inductor element may be connected in parallel or in series between the first feeding point and/or the second feeding point and the radio frequency front end. In this embodiment, the tuning element 50 includes a capacitor element connected between the second feeding point D and the radio frequency front end 20. The capacitor element is disposed between the second feeding point D and the radio frequency front end 20, so that the second sub-radiator 13 can generate a composite right/left-handed antenna mode. Therefore, a size of the radiator 10 can be reduced as much as possible and an antenna deployment space can be reduced while a required operating band can be obtained. It may be understood that, in another embodiment of this application, a tuning element such as a capacitor element or an inductor element may also be connected between the radio frequency front end 20 and the first feeding point C, to obtain a required antenna mode.

Figure 7:
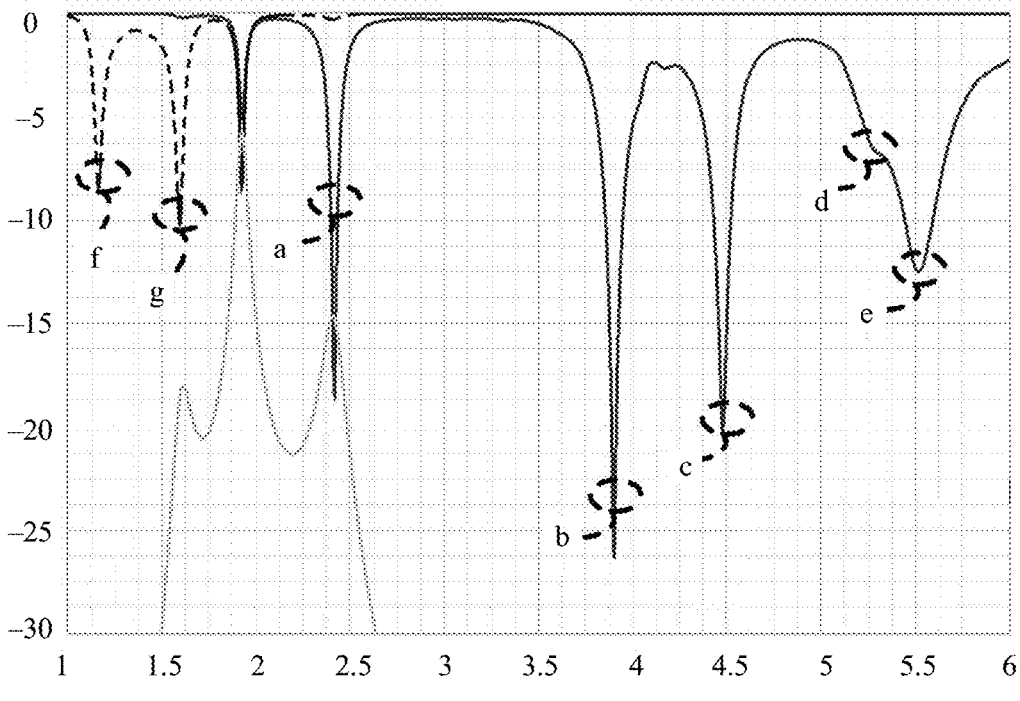
FIG. 7 is a simulation diagram of an S parameter of the radiator sharing antenna in the embodiment of FIG. 6.

FIG. 7 is a simulation diagram of an S parameter of the antenna 100 sharing a radiator according to the embodiment of this application shown in FIG. 6. A dark solid line is a simulation diagram of an S22 parameter of operating bands generated through resonance of the first sub-radiator 12 and parasitic resonance of the second sub-radiator 13 by a signal fed through the first feeding point C. A light solid line is a simulation diagram of an S21 parameter of the antenna 100 sharing a radiator. A dark dashed line is a simulation diagram of an S11 parameter of operating bands generated through resonance of the second sub-radiator 13 and parasitic resonance of the first sub-radiator 12 by a signal fed through the second feeding point D. A horizontal coordinate indicates a frequency in a unit of GHz. A vertical coordinate indicates a value of an S parameter in a unit of dB. As can be seen from the figure, the signal fed through the first feeding point C generates at least five types of resonance including resonance a, resonance b, resonance c, resonance d, and resonance e through the resonance of the first sub-radiator 12 and the parasitic resonance of the second sub-radiator 13. The signal fed through the second feeding point D generates at least two types of resonance including resonance f and resonance g through the resonance of the second sub-radiator 13 and the parasitic resonance of the first sub-radiator 12.

The operating bands generated through the resonance of the first sub-radiator 12 and the parasitic resonance of the second sub-radiator 13 by the signal fed through the first feeding point C cover operating bands of a Wi-Fi antenna and a Sub 6G antenna, that is, the Wi-Fi antenna and the Sub 6G antenna share the radiator. Therefore, a quantity of radiators can be reduced, and a quantity of feeding points, a quantity of springs connecting the feeding point to the radio frequency front end, a quantity of resonant elements for adjusting the antenna mode, and the like can be reduced, to simplify an antenna structure and reduce deployment space of the antenna 100 sharing a radiator. In this embodiment, the Wi-Fi antenna mode specifically includes a 2.4G Wi-Fi antenna mode and a 5G Wi-Fi antenna mode. An operating frequency in the 2.4G Wi-Fi antenna mode is 2.4 GHz to 2.5 GHZ, that is, a band corresponding to a location of the resonance a in FIG. 7. An operating frequency in the 5G Wi-Fi antenna mode is 4.9 GHZ to 5.9 GHZ, that is, a band corresponding to locations of the resonance d and the resonance e in FIG. 7. The Sub 6G antenna mainly is an antenna mode whose operating band is lower than 6 GHz. In some embodiments of this application, the Sub 6G band mainly includes a 5G band such as an N77 band, an N78 band, and an N79 band, so that the antenna 100 sharing a radiator can meet an existing 5G communication requirement. An operating frequency in an N77 antenna mode is 3.3 GHz to 4.2 GHz, an operating frequency in an N78 antenna mode is 3.3 GHz to 3.8 GHz, and an operating frequency in an N79 antenna mode is 4.4 GHz to 5.0 GHZ, that is, a band corresponding to locations of the resonance b and the resonance c in FIG. 7.

Specifically, operating bands that can be generated through the resonance of the first sub-radiator 12 include a first operating band, a second operating band, and a third operating band, and operating bands generated through the parasitic resonance of the second sub-radiator 13 include a fourth operating band and a fifth operating band. The first operating band covers an operating band of a 2.4G Wi-Fi antenna, the second operating band and the fourth operating band cover the operating band of the Sub 6G antenna, and the third operating band and the fifth operating band cover an operating band of a 5G Wi-Fi antenna. In these embodiments, the operating bands generated through the resonance of the first sub-radiator 12 and the parasitic resonance generated by the second sub-radiator 13 can cover operating bands of the Sub 6G antenna, the 2.4G Wi-Fi antenna, and the 5G Wi-Fi antenna, that is, the radiator 10 can simultaneously implement that the Sub 6G antenna, the 2.4G Wi-Fi antenna, and the 5G Wi-Fi antenna share the radiator, thereby reducing deployment space of the antenna 100 sharing a radiator. It may be understood that, in another embodiment of this application, the antenna 100 sharing a radiator can also generate another required operating band by adjusting a location of the first feeding point C and/or the second feeding point D, a location of the gap 11, a size or a shape of the radiator 10, or the like.

Figure 8:
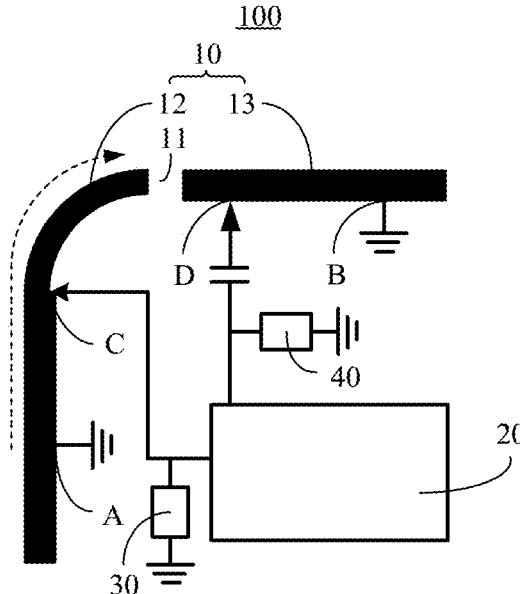
FIG. 8 is a schematic diagram of current distribution that is in a quarter antenna mode of an IFA and that is generated through resonance of a first sub-radiator of the radiator sharing antenna in the embodiment of FIG. 6.

Specifically, the first operating band is an operating band that is in a quarter antenna mode of an IFA and that is generated through the resonance of the first sub-radiator 12, and current distribution of the first operating band is indicated by an arrow direction in FIG. 8. A current direction in the quarter antenna mode of the IFA is from the first ground point A to the gap 11.

Figure 9:
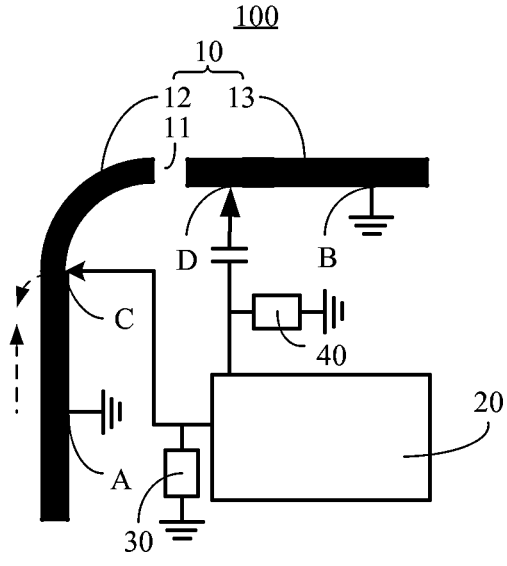
FIG. 9 is a schematic diagram of current distribution that is in a half-wavelength mode of a loop antenna and that is generated through resonance of a first sub-radiator of the radiator sharing antenna in the embodiment of FIG. 6.

The second operating band is in a half-wavelength mode of a loop antenna and is generated through the resonance of the first sub-radiator 12, and current distribution of the second operating band is indicated by an arrow direction in FIG. 9. Specifically, there is a current zero between the first feeding point C and the first ground point A, and a current separately flows from the first feeding point C and the first ground point A to the current zero. The current zero is a location at which a current is 0.

Figure 10:
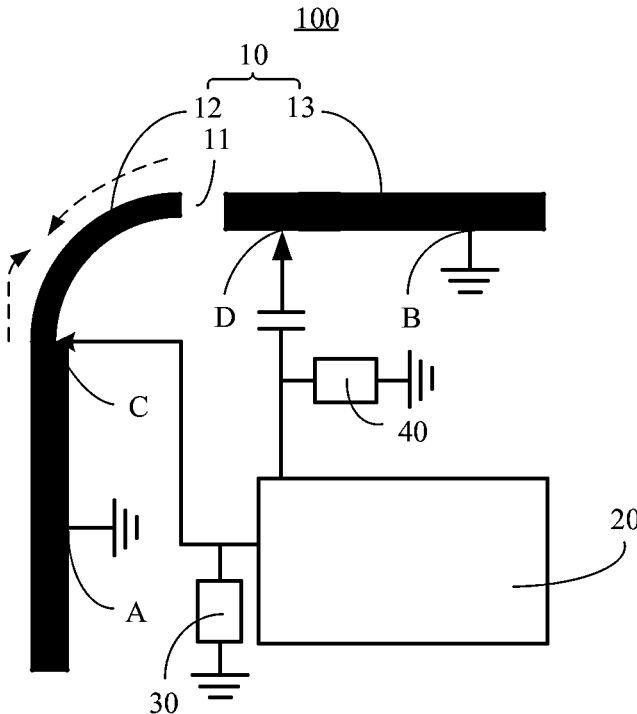
FIG. 10 is a schematic diagram of current distribution that is in a three-quarters antenna mode of an IFA and that is generated through resonance of a first sub-radiator of the radiator sharing antenna in the embodiment of FIG. 6.

The third operating band is an operating band that is in a three-quarters antenna mode of the IFA and that is generated through the resonance of the first sub-radiator 12, and current distribution of the third operating band is indicated by an arrow direction in FIG. 10. There is a current zero between the first feeding point C and the gap 11, and a current separately flows from the first feeding point C and the gap 11 to the current zero.

Figure 11:
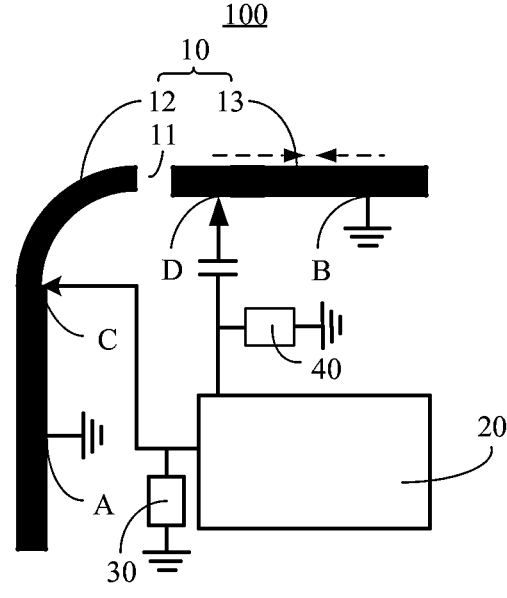
FIG. 11 is a schematic diagram of current distribution that is in a half-wavelength mode of a parasitic loop antenna and that is generated through parasitic resonance of a second sub-radiator of the radiator sharing antenna in the embodiment of FIG. 6.

In this embodiment, because the second filter circuit 40 connected between the radio frequency front end 20 and the second feeding point D is a high-pass low-impedance filter circuit, the second filter circuit 40 allows a radio frequency signal in the fourth operating band to be fed. In addition, the radio frequency signal passes through the second sub-radiator 13 and is grounded by using the second ground point B. In this case, a wavelength mode generated through the parasitic resonance of the second sub-radiator 13 is a half-wavelength mode of a parasitic loop antenna, and an operating band in the half-wavelength mode of the parasitic loop antenna covers the fourth operating band. Current distribution in the half-wavelength mode of the parasitic loop antenna is indicated by an arrow direction in FIG. 11. A current zero is formed between the second feeding point D and the second ground point B, and a current separately flows from the second feeding point D and the second ground point B to the current zero.

Figure 12:
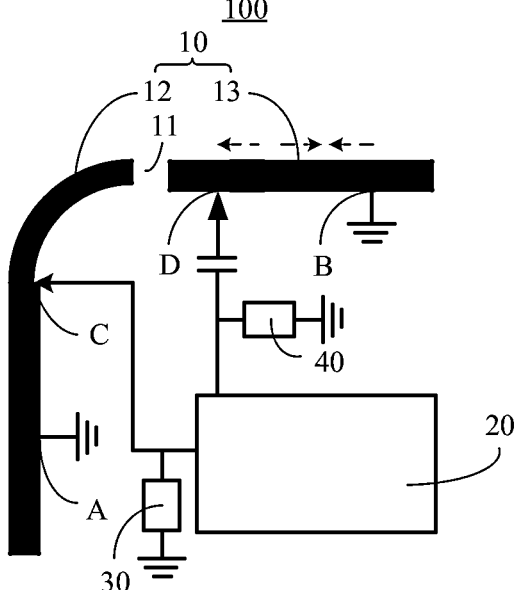
FIG. 12 is a schematic diagram of current distribution that is in a three-seconds-wavelength mode of a parasitic loop antenna and that is generated through parasitic resonance of a second sub-radiator of the radiator sharing antenna in the embodiment of FIG. 6.

In this embodiment, because the second filter circuit 40 connected between the radio frequency front end 20 and the second feeding point D is a high-pass low-impedance filter circuit, the second filter circuit 40 allows a radio frequency signal in the fifth operating band to be fed. In addition, the radio frequency signal passes through the second sub-radiator 13 and is grounded by using the second ground point B. In this case, a wavelength mode generated through the parasitic resonance of the second sub-radiator 13 is a three-seconds-wavelength mode of a parasitic loop antenna, and an operating band in the three-seconds-wavelength mode of the parasitic loop antenna covers the fifth operating band. Current distribution in the three-seconds-wavelength mode of the parasitic loop antenna is indicated by an arrow direction in FIG. 12. Two spaced current zeros are formed between the second feeding point D and the second ground point B, are respectively a first zero and a second zero, and are closer to the gap. In addition, a current in the three-seconds-wavelength mode of the parasitic loop antenna separately flows from the first zero and the second ground point B to the second zero, and a part of the current flows from the first zero to the gap.

The operating bands generated through the resonance of the second sub-radiator 13 and the parasitic resonance of the first sub-radiator 12 cover operating bands in a GPS L1 antenna mode and a GPS L5 antenna mode, so that a GPS L1 antenna and a GPS L5 antenna can be designed to share a radiator. Therefore, a quantity of radiators can be reduced, and a quantity of feeding points, a quantity of springs connecting the feeding point to the radio frequency front end, a quantity of resonant elements for adjusting the antenna mode, and the like can be reduced, to simplify an antenna structure and reduce deployment space of the antenna 100 sharing a radiator. An operating band of the GPS L5 antenna is 1176.45 MHz, that is, a band corresponding to a location of the resonance f in FIG. 7. An operating band of the GPS L1 antenna is 1575.42 MHz, that is, a band corresponding to a location of the resonance g in FIG. 7.

Specifically, in this embodiment, operating bands generated through the resonance of the second sub-radiator 13 include a sixth operating band, operating bands generated through the parasitic resonance of the first sub-radiator 12 include a seventh operating band, the sixth operating band covers the operating band of the GPS L5 antenna, and the seventh operating band covers the operating band of the GPS L1 antenna. In this way, the operating band generated by the radiator 10 can cover both the operating band of the GPS L5 antenna and the operating band of the GPS L1 antenna, so that the GPS L1 antenna and the GPS L5 antenna share the radiator and antenna deployment space is reduced.

Figure 13:
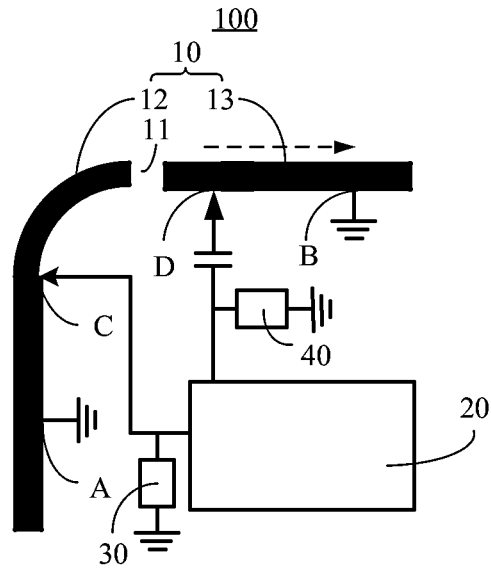
FIG. 13 is a schematic diagram of current distribution that is in a composite right/left-handed antenna mode and that is generated through resonance of a second sub-radiator of the radiator sharing antenna in the embodiment of FIG. 6.

In this embodiment, the sixth operating band is an operating band that is in a composite right/left-handed antenna mode (CRLH antenna mode) and that is generated through the resonance of the second sub-radiator 13, and current distribution of the sixth operating band is shown in FIG. 13. A current direction in the composite right/left-handed antenna mode is from the second feeding point D to the second ground point B through the second radiator 13.

In this embodiment, the composite right/left-handed antenna mode generates the sixth operating band, and a length of the radiator 10 in the composite right/left-handed antenna mode is ⅛λ, that is, a length of the radiator between the first feeding point C and the first ground point A is ⅛ of a wavelength. Compared with another antenna mode, the radiator 10 has a smaller length, thereby further reducing antenna deployment space.

Figure 14:
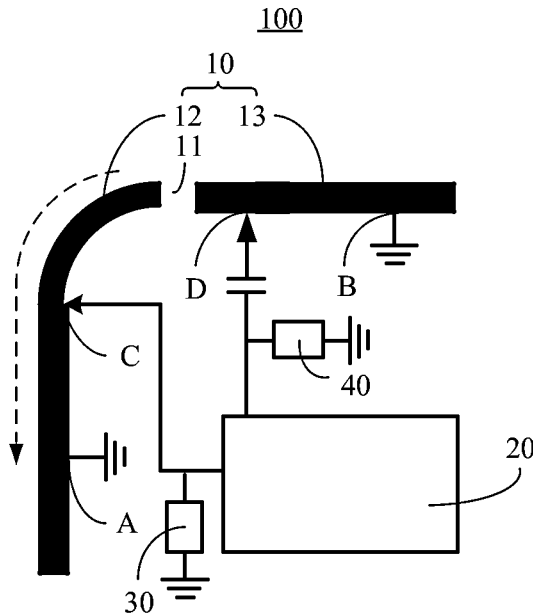
FIG. 14 is a schematic diagram of current distribution that is in a quarter-wavelength parasitic antenna mode and that is generated through parasitic resonance of a first sub-radiator of the radiator sharing antenna in the embodiment of FIG. 6.

Because the first filter circuit 30 connected between the radio frequency front end 20 and the first feeding point C is a high-impedance low-pass filter circuit, the first filter circuit 30 allows a radio frequency signal in the seventh operating band to be fed. In this way, an operating band that is in a quarter-wavelength parasitic antenna mode and that is formed through parasitic resonance generated by the first sub-radiator 12 under influence of the second sub-radiator 13 covers the seventh operating band. Current distribution in the quarter-wavelength parasitic antenna mode is shown in FIG. 14. A current direction that is in the quarter-wavelength parasitic antenna mode and that is formed through parasitic resonance is from the gap 11 to the first ground point A.

In some embodiments of this application, the operating bands generated through the resonance of the first sub-radiator and the parasitic resonance of the second sub-radiator cover operating bands of a Wi-Fi antenna and a Sub 6G antenna. In addition, the operating bands generated through the resonance of the second sub-radiator and the parasitic resonance of the first sub-radiator cover operating bands of a GPS L1 antenna and a GPS L5 antenna. In this way, the Wi-Fi antenna, the Sub 6G antenna, the GPS L1 antenna, and the GPS L5 antenna can share the radiator, so that the radiator sharing antenna occupies relatively small space while covering operating bands in a plurality of different antenna modes. In addition, the radiator sharing antenna can cover a plurality of antenna modes by using the two feeding points (the first feeding point and the second feeding point). Compared with an antenna in the conventional technology, a quantity of feeding points can be reduced, thereby reducing a quantity of springs or connection cables that connect the feeding points to a radio frequency front end and a quantity of resonance elements for adjusting an antenna mode. This simplifies an antenna structure and further reduces space occupied by the antenna.

Further, in this application, a width of the gap 11 needs to be within a specific range to avoid an excessively wide or narrow width of the gap, so as to ensure that the first radiator and the second radiator can influence each other in a specific operating band to generate parasitic resonance. Therefore, a quantity of antenna modes is increased without increasing an antenna structure, so as to reduce space occupied by the antenna 100 sharing a radiator. In some embodiments of this application, the width of the gap 11 is greater than one-thirty-second of a wavelength of a highest resonance frequency and is less than one-sixteenth of a wavelength of the highest resonance frequency. The highest resonance frequency is a highest operating frequency of operating frequencies in the plurality of different antenna modes of the radiator sharing antenna. Specifically, for the radiator sharing antenna that implements that the Wi-Fi antenna, the Sub 6G antenna, the GPS L1 antenna, and the GPS L5 antenna share the radiator, the highest resonance frequency is an operating band of the 5G Wi-Fi.

Figure 15:
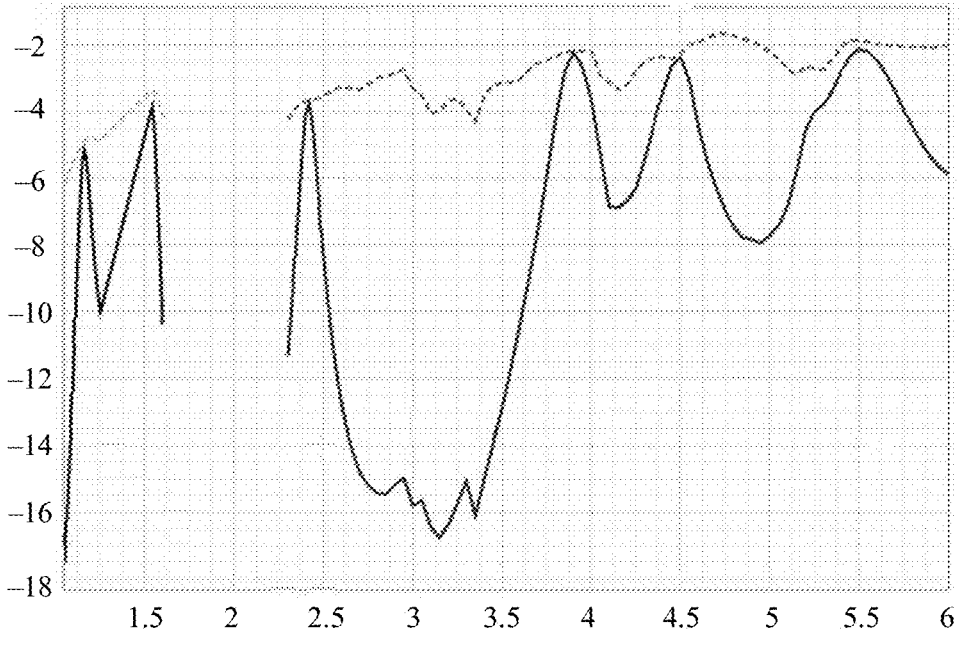
FIG. 15 is a simulation diagram of efficiency of the radiator sharing antenna in the embodiment of FIG. 6.

FIG. 15 is a simulation efficiency diagram of an antenna 100 sharing a radiator according to an embodiment of this application, where a horizontal coordinate is a frequency in a unit of GHz, and a vertical coordinate indicates efficiency in a unit of dBp. As can be seen from the figure, radiation efficiency of each operating band is above −5 dBp and has relatively high radiation efficiency. In addition, radiation efficiency of a band above 3 GHz is relatively high. Radiation efficiency of the GPS L1 antenna whose operating band is 1575.42 MHz is around 1 dB lower than radiation efficiency of the GPS L5 antenna whose operating band is 1176.45 MHz.

Figure 16A:
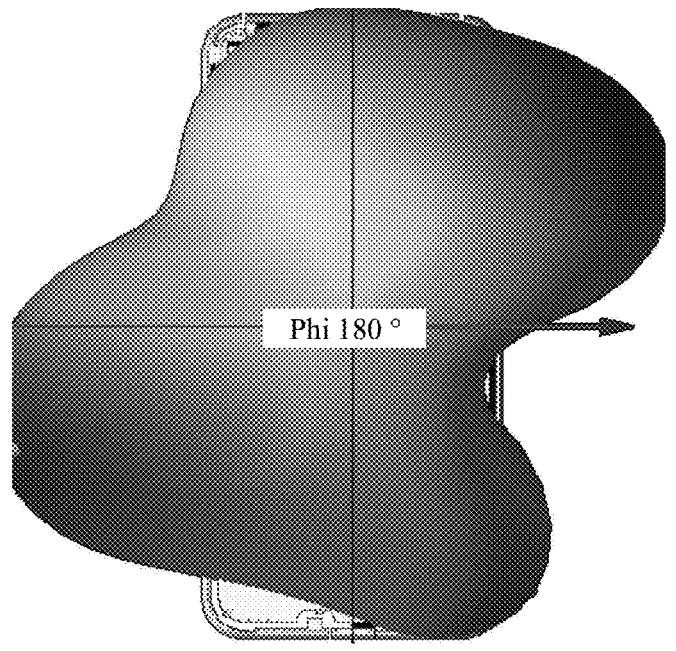
FIG. 16A is a simulation diagram of a radiation direction in a GPS L1 antenna mode of the radiator sharing antenna in the embodiment of FIG. 6.
Figure 16B:
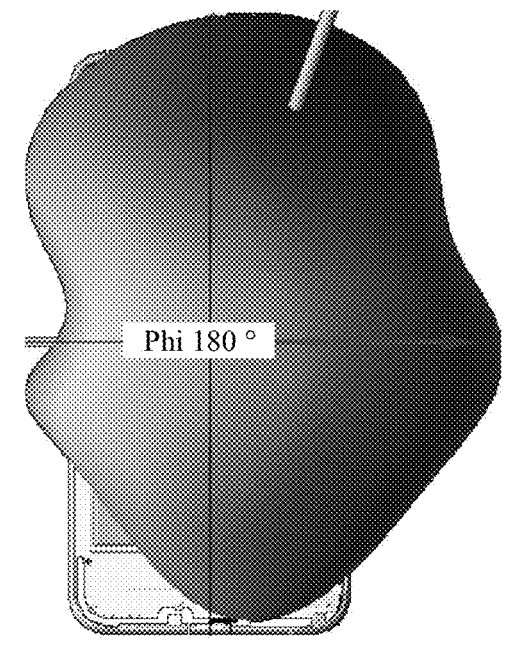
FIG. 16B is a simulation diagram of a radiation direction in a GPS L5 antenna mode of the radiator sharing antenna in the embodiment of FIG. 6.
Figure 16C:
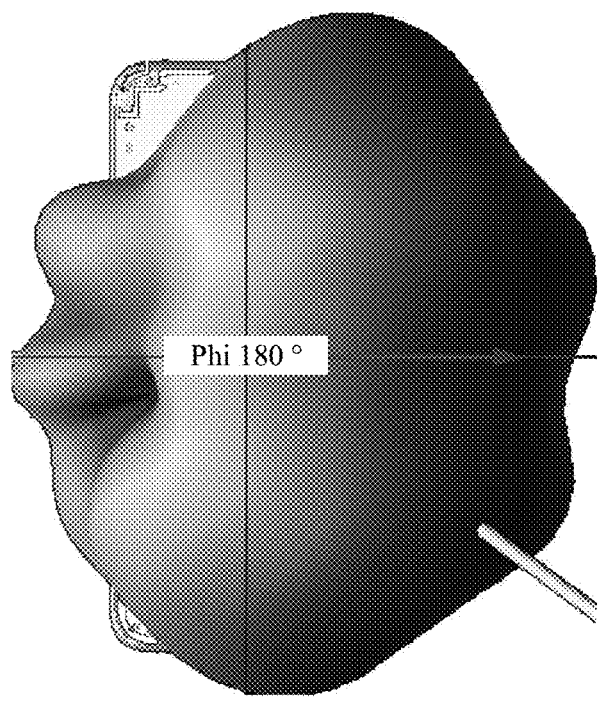
FIG. 16C is a simulation diagram of a radiation direction in a 2.4G Wi-Fi antenna mode of the radiator sharing antenna in the embodiment of FIG. 6.
Figure 16D:
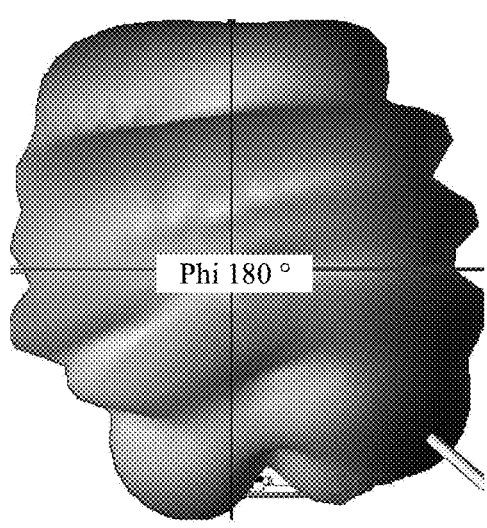
FIG. 16D is a simulation diagram of a radiation direction in a 5G Wi-Fi antenna mode of the radiator sharing antenna in the embodiment of FIG. 6.

Refer to FIG. 16A, FIG. 16B, FIG. 16C, and FIG. 16D. FIG. 16A and FIG. 16B are separately simulation diagrams of radiation directions in a GPS L1 antenna mode and a GPS L5 antenna mode. As can be seen from the figures, the GPS L5 antenna mode and the GPS L1 antenna mode each have upper hemisphere ratios greater than −3 dB, and the upper hemisphere ratios are relatively high, thereby facilitating user experience. FIG. 16C and FIG. 16D are separately simulation diagrams of radiation directions in a 2.4G Wi-Fi antenna mode and a GPS L5 antenna mode. As can be seen from the figures, directivity in the 2.4G Wi-Fi antenna mode is around 4 and directivity in the 5G Wi-Fi antenna mode is around 5.5. Therefore, directivity is relatively desirable.

Further, in this application, a distance from the first feeding point C to the gap 11, a distance from the second feeding point D to the gap 11, a distance from the first ground point A to the gap 11, and a distance from the first ground point A to the gap 11 also need to fall within a specific range, so that the antenna 100 sharing a radiator can generate a required operating band to meet an actual usage requirement. In some embodiments of this application, the distance from the first feeding point C to the gap 11 is one-sixteenth of a wavelength of an operating frequency that is in an antenna mode and that is formed between the first feeding point C and the gap 11, the distance from the second feeding point D to the gap 11 is one-eighth of a wavelength of an operating frequency that is in an antenna mode and that is formed between the second feeding point D and the gap 11, the distance from the first ground point C to the gap 11 is a quarter of a wavelength of an operating frequency that is in an antenna mode and that is formed between the first ground point C and the gap 11, and the distance from the second ground point B to the gap 11 is a quarter of a wavelength of an operating frequency that is in an antenna mode and that is formed between the second ground point B and the gap 11, so as to obtain the antenna modes in the foregoing embodiments.

Figure 17:
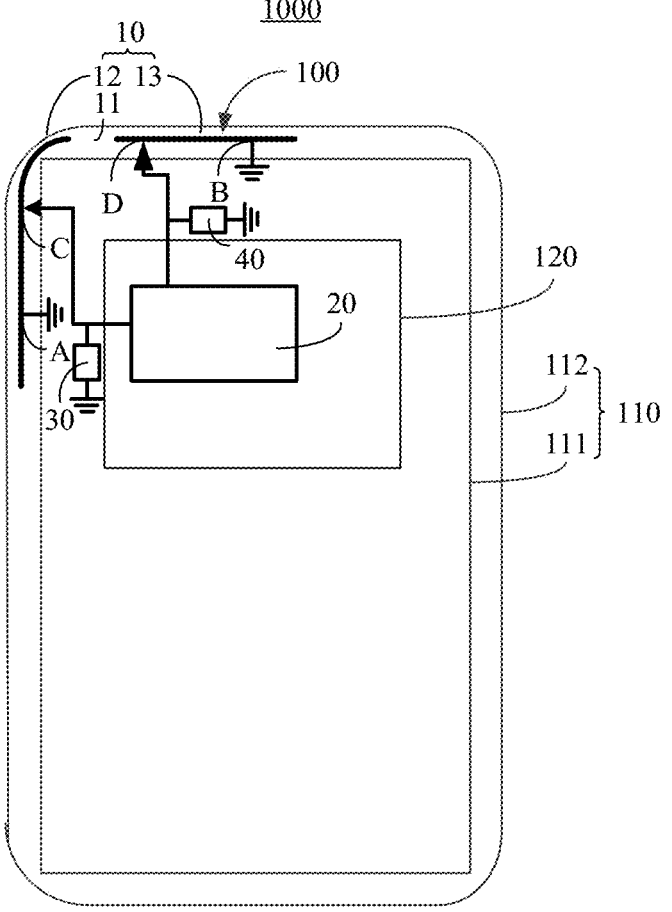
FIG. 17 is a schematic structural diagram of an electronic device according to an embodiment of this application.

Referring to FIG. 17, this application further provides an electronic device 1000. The electronic device 1000 may be a mobile phone, a tablet, a mobile watch, or the like. The electronic device 1000 includes a middle frame 110, a mainboard 120, and the antenna 100 sharing a radiator. The middle frame 110 is grounded, and a first ground point A and a second ground point B of the antenna 100 sharing a radiator each are connected to the middle frame 110, to implement grounding of the first ground point A and the second ground point B. The radio frequency front end 20 of the antenna 100 sharing a radiator is disposed on the mainboard 120, and the mainboard 120 is disposed on the middle frame 110. Because the antenna 100 sharing a radiator occupies relatively small space, a required clearance is also relatively small. Therefore, more antennas can be deployed in limited space and antenna performance can be improved. In an embodiment of this application, a clearance of the antenna 100 sharing a radiator is around 1.3 mm.

Specifically, the middle frame 110 includes a middle plate 111 and a frame 112 disposed around the middle plate, a radiator 10 of the antenna 100 sharing a radiator is disposed between the middle plate 111 and the frame 112, and the mainboard 120 is fixed to the middle plate 111. In this embodiment, the frame 112 is a non-metal frame, and a radio frequency signal generated or received by the radiator 10 can be transmitted through the non-metal frame, so as to avoid that the frame 112 limits a signal of the antenna 100 sharing a radiator. The antenna 100 sharing a radiator may be in a form of a flexible mainboard (Flexible Printed Circuit, FPC), laser direct structuring (Laser-Direct-structuring, LDS), a microstrip antenna (Microstrip Disk Antenna, MDA), or the like.

Figure 18:
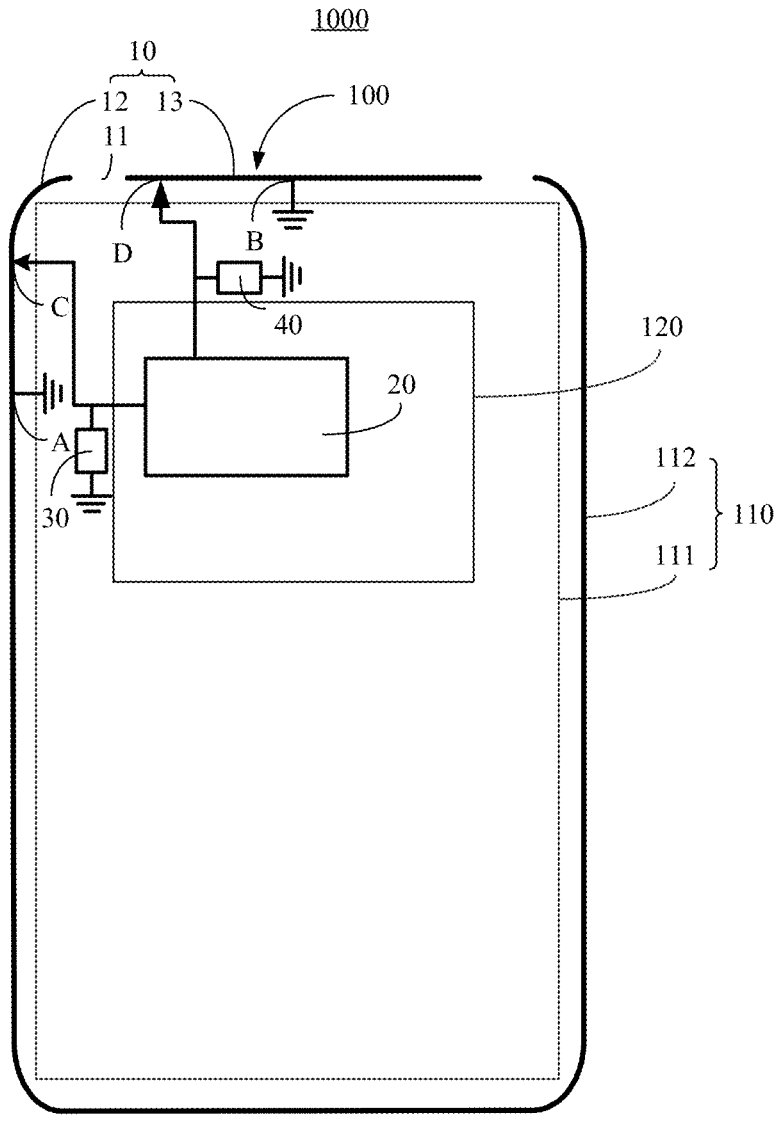
FIG. 18 is a schematic structural diagram of an electronic device according to another embodiment of this application.

Referring to FIG. 18, some other embodiments of this application provide an electronic device 1100. A difference of the electronic device 1100 from the electronic device 1000 is as follows: a frame 112 of the electronic device 1100 is a metal frame, and a part of the metal frame is the radiator 10 of the antenna 100 sharing a radiator. The metal frame is used as the radiator 10 of the antenna 100 sharing a radiator, so that space occupied by the radiator sharing antenna can be further reduced. In this embodiment, a gap 11 of the antenna 100 sharing a radiator is located on an upper frame of the frame 112. It may be understood that, in another embodiment of this application, the gap 11 of the antenna 100 sharing a radiator may alternatively be located on a side frame of the frame 112.

The foregoing descriptions are preferred implementations of this application. It should be noted that a person of ordinary skill in the art may make several improvements or polishing without departing from the principle of this application, and the improvements or polishing shall fall within the protection scope of this application.

What is claimed is:

1. A terminal device comprising:
   a radiator sharing antenna, comprising:
      a radiator comprising:
         a first end; and
         a second end;
      a first ground point located at the first end;
      a second ground point located at the second end;
      a gap located between the first ground point and the second ground point, wherein the gap divides the radiator into a first sub-radiator and a second sub-radiator, and wherein the gap provides a capacitive coupling between the first sub-radiator and the second sub-radiator;
      a first feeding point located on the first sub-radiator, wherein the first feeding point is configured to pass a first radio frequency signal through a first resonance of the first sub-radiator and through a first parasitic resonance of the second sub-radiator;
      a second feeding point located on the second sub-radiator, wherein the second feeding point is configured to pass a second radio frequency signal through a second resonance of the second sub-radiator and through a second parasitic resonance of the first sub-radiator;
      a middle frame;

a mainboard disposed on the middle frame, wherein the mainboard is separated from the first sub-radiator and the second sub-radiator; and
      a radio frequency front end disposed on the mainboard and coupled with the first feeding point and the second feeding point.

2. The terminal device of claim 1, wherein a first distance from the first feeding point to the gap is one-sixteenth of a wavelength of an operating frequency in an antenna mode between the first feeding point and the gap, wherein a second distance from the second feeding point to the gap is one-eighth of a wavelength of an operating frequency in an antenna mode between the second feeding point and the gap, wherein a third distance from the first ground point to the gap is a quarter of a wavelength of an operating frequency in an antenna mode between the first ground point and the gap, and wherein a fourth distance from the second ground point to the gap is a quarter of a wavelength of an operating frequency in an antenna mode between the second ground point and the gap.

3. The terminal device of claim 1, wherein the radiator is detached from ground between the first ground point and the second ground point.

4. The terminal device of claim 1, further comprising:
   a first filter circuit comprising a first end coupled with the first feeding point and comprising a second end that is grounded; and
   a second filter circuit comprising a first end coupled with the second feeding point and comprising a second end that is grounded.

5. The terminal device of claim 4, wherein the first filter circuit is a high-impedance low-pass filter circuit, and wherein the second filter circuit is a high-pass low-impedance filter circuit.

6. The terminal device of claim 4, wherein the first filter circuit and the second filter circuit each comprise a first capacitor and a first inductor disposed in parallel.

7. The terminal device of claim 6, wherein the first filter circuit or the second filter circuit further comprises a second inductor coupled in series with the first capacitor, and wherein the first filter circuit or the second filter circuit further comprises a second capacitor coupled in series to the first capacitor and the first inductor.

8. The terminal device of claim 1, further comprising a first capacitor element disposed between the second feeding point and the radio frequency front end.

9. The terminal device of claim 1, wherein the middle frame comprises a middle plate and a frame disposed around the middle plate, and wherein the frame is a non-metal frame and the first sub-radiator and the second sub-radiator are disposed between the middle plate and the frame.

10. The terminal device of claim 1, wherein the middle frame comprises a middle plate and a metal frame disposed around the middle plate, wherein a portion of the frame defines the first sub-radiator and the second sub-radiator, and wherein the middle plate is separated from the first sub-radiator and the second sub-radiator.

11. The terminal device of claim 1, wherein the middle frame is grounded, and wherein the first ground point and the second ground point of the radiator sharing antenna are grounded via the middle frame.

12. The terminal device of claim 1, wherein the first feeding point and the second feeding point are configured to simultaneously perform signal transmission in two operating bands that are simultaneously generated on the radiator.

13. The terminal device of claim 1, wherein a frequency of the first resonance and a frequency of the first parasitic resonance, are each higher than a frequency of the second resonance and a frequency of the second parasitic resonance.

14. The terminal device of claim 8, the first capacitor element is configured to cause the second sub-radiator to generate a composite right/left-handed antenna mode.

15. The terminal device of claim 1, further comprising a second capacitor element disposed between the first feeding point and the radio frequency front end.

16. The terminal device of claim 15, the second capacitor element is configured to cause the first sub-radiator to generate a composite right/left-handed antenna mode.

17. A radio frequency transmission method comprising:
  providing a gap located between a first ground point and a second ground point of a radiator of a radio sharing antenna, wherein the gap divides the radiator into a first sub-radiator and a second sub-radiator, and wherein the gap provides a capacitive coupling between the first sub-radiator and the second sub-radiator;
  providing a middle frame and a mainboard, wherein the mainboard is disposed on the middle frame, and separated from the first sub-radiator and the second sub-radiator;
  providing a radio frequency front end on the mainboard, the radio frequency front end is coupled with a first feeding point located on the first sub-radiator and a second feeding point located on the second sub-radiator;
  feeding a first radio frequency signal through the first feeding point to the first sub-radiator to generate a first resonance of the first sub-radiator and a first parasitic resonance of the second sub-radiator; and
  feeding a second radio frequency signal through the second feeding point to the second sub-radiator to generate a second resonance of the second sub-radiator and a second parasitic resonance of the first sub-radiator.

18. The radio frequency transmission method of claim 17, wherein a first distance from the first feeding point to the gap is one-sixteenth of a wavelength of an operating frequency in an antenna mode generated between the first feeding point and the gap, wherein a second distance from the second feeding point to the gap is one-eighth of a wavelength of an operating frequency in an antenna mode generated between the second feeding point and the gap, wherein a third distance from the first ground point to the gap is a quarter of a wavelength of an operating frequency in an antenna mode generated between the first ground point and the gap, and wherein a fourth distance from the second ground point to the gap is a quarter of a wavelength of an operating frequency in an antenna mode generated between the second ground point and the gap.

19. The radio frequency transmission method of claim 17, wherein the radiator is detached from ground between the first ground point and the second ground point.

20. The radio frequency transmission method of claim 17, further comprising:
  coupling a first end of a first filter circuit to the first feeding point, wherein a second end of the first filter circuit is grounded; and
  coupling a first end of a second filter circuit to the second feeding point, wherein a second end of the second filter circuit is grounded.

21. The radio frequency transmission method of claim 17, comprising filtering an output of the first feeding point with a high-impedance low-pass filter circuit, and filtering an output of the second feeding point with a high-pass low-impedance filter circuit.

22. The radio frequency transmission method of claim 17, comprising transmitting two signals simultaneously generated on the radiator in two operating bands.

23. The radio frequency transmission method of claim 17, further comprising:
  the first radio frequency signal through the first resonance comprises a first antenna operating band;
  the first radio frequency signal through the first parasitic resonance comprises a first parasitic operating band;
  the second radio frequency signal through the second resonance comprises a second antenna operating band;
  the second radio frequency signal through the second parasitic resonance comprises a second parasitic operating band.

24. The radio frequency transmission method of claim 17, wherein a frequency of the first resonance and a frequency of the first parasitic resonance, are each higher than a frequency of the second resonance and a frequency of the second parasitic resonance.

* * * * *